United States Patent

Mescheryak et al.

[15] 3,644,699
[45] Feb. 22, 1972

[54] CONDENSER SPOT-WELDING MACHINE

[72] Inventors: Sergei Nikolaevich Mescheryak, ulitsa Yanvarskogo Vosstania, 17a, kv. 6; Evgeny Petrovich Stemkovsky, ulitsa Brigadirskaya, 27, kv. 1; Igor Vladimirovich Pentegov, Zadorzhny pereulok, 13, kv. 14; David Semenovich Vorona, ulitsa Scherbakova, 51, kv. 21; Vladislav Eduardovich Moravsky, bulvar Lesi Ukrainki, 2, kv. 50, all of Kiev, U.S.S.R.

[22] Filed: Sept. 12, 1969

[21] Appl. No.: 857,339

[52] U.S. Cl. ........................................................ 219/113
[51] Int. Cl. ........................................................ B23k 11/26
[58] Field of Search ........................... 219/113, 108–110, 219/114

[56] References Cited

UNITED STATES PATENTS 3,406,324  10/1968  Ayers .................................. 219/113 X Primary Examiner—J. V. Truhe
Assistant Examiner—J. G. Smith
Attorney—Waters, Roditi, Schwartz & Nissen

[57] ABSTRACT

A condenser spot-welding machine, comprising: a rectifier unit to charge an operating capacitor bank; two gates one of which ensures the discharge of the capacitor bank, the other one connecting the capacitor bank for charging; a control unit wherein serving as the input is a voltage level setter connected in parallel with the operating capacitor bank, the output being an actuating unit acting on said gates, while said voltage level setter in the control unit consists of at least two voltage dividers to whose outputs there are coupled shaping capacitors alternately connected to the control unit circuits shaping the control pulses.

3 Claims, 2 Drawing Figures

CONDENSER SPOT-WELDING MACHINE

The present invention relates to electric welding, and more particularly to condenser discharge spot-welding machines.

Known in the art are condenser discharge welders, comprising: a rectifier unit to charge a bank of operating capacitors, two gates, one of which ensures the discharge of the capacitor bank, while the second one connects the capacitor bank for charging, and a control unit wherein serving as the input is a voltage level setter connected in parallel with the operating capacitor bank, the output being an actuating unit consisting of a dynistor and two relays.

Prior art machines have a disadvantage consisting in the single-pulse cycle of their work, which does not permit stable quality weld joints to be produced. Besides, these machines have contact elements reducing the reliability the work of such machines.

A contact element in the circuit of the voltage level setter involves employment of a low-ohmic voltage divider, which is undesirable.

The object of the present invention is to eliminate the described disadvantages.

The principal object of the invention is to provide a condenser discharge welding machine ensuring at least a two-pulse welding cycle, a high degree of voltage stabilization across the capacitors, and a smooth independent adjustment of the current pulse amplitude.

This object is achieved by that in a condenser discharge welding machine, comprising a rectifier unit to charge a bank of operating capacitors, two gates, one of which ensures the discharge of the capacitor bank, while the other one connects the capacitor bank for charging and a control unit, wherein serving as the input is a voltage level setter placed in parallel with the operating capacitor bank, the output being an actuating unit acting an said gates, the voltage level setter in the control unit consists, according to the invention, of at least two voltage dividers to whose outputs there are coupled shaping capacitors being alternately connected to the control unit circuits that shape the control pulses.

It is expedient that one of the control unit circuits shaping the control pulses should include, in series, a dynistor and a primary winding of a three-winding pulse transformer, while the rest of the circuits should include, in series, a dynistor, a primary winding of a two-winding pulse transformer, and a dividing capacitor parallel to which there are connected, in series, a resistor, normally open contacts of the starting pushbutton, and a bias source ensuring the switched-in condition of the dynistor after the action thereof, while the secondary winding of the pulse transformers are advisable to be connected, through diodes, to one of the operating electrodes and to the control electrode of the discharge gate, and the third winding of the three-winding pulse transformer should be connected to the control circuit of the charge gate.

Besides, the charge gate control circuit is advisable to be composed, in series, of a bias source, a dynistor shunted by normally closed contacts of the starting pushbutton, a current-limiting resistor, and a reference diode connected to the third winding of the three-winding transformer, the dynistor being connected through a limiting resistor to one of the operating electrodes and to the control electrode of the charge gate.

The proposed machine ensures smooth adjustment and high stability of voltage across the capacitors, and ensures a combined welding cycle with optimum heating conditions in the welding zone.

In a two-pulse cycle the first pulse of welding current eliminates the spread of the initial contact resistances, thus providing equal temperature conditions for the development of the welding process. This is why the two-pulse cycle provided by the machine eliminates the diversity in the strength of weld joints, raises stability and quality of weld joints, and rules out the possibility of metal splashes from the welding zone. This is largely promoted by the independent adjustment of the first (forming) and second (welding) current pulses, as well as by the adjustment of the time interval between the two current pulses.

The machine is insensitive to powerline voltage variations within ±1.5 percent, it permits accumulating a strictly measured amount of energy, and stabilizes the electric characteristics of welding conditions, the electric circuit of the machine being simple, economical, and securing both high productivity and power efficiency.

A particular effect is expected of using the proposed machine for precision resistance microwelding of integrated circuits, electronic and semiconductor articles with high production specifications (absence of metal splashes, stability and high-strength characteristics of parts being welded).

The proposed machine allows welding to be performed with any number of welding current pulses, however, in the specification of the invention we shall confine ourselves to the work of a machine with a two-pulse cycle.

Following is a description of an embodiment of the invention with references to the appended drawings, wherein.

Figure 1:
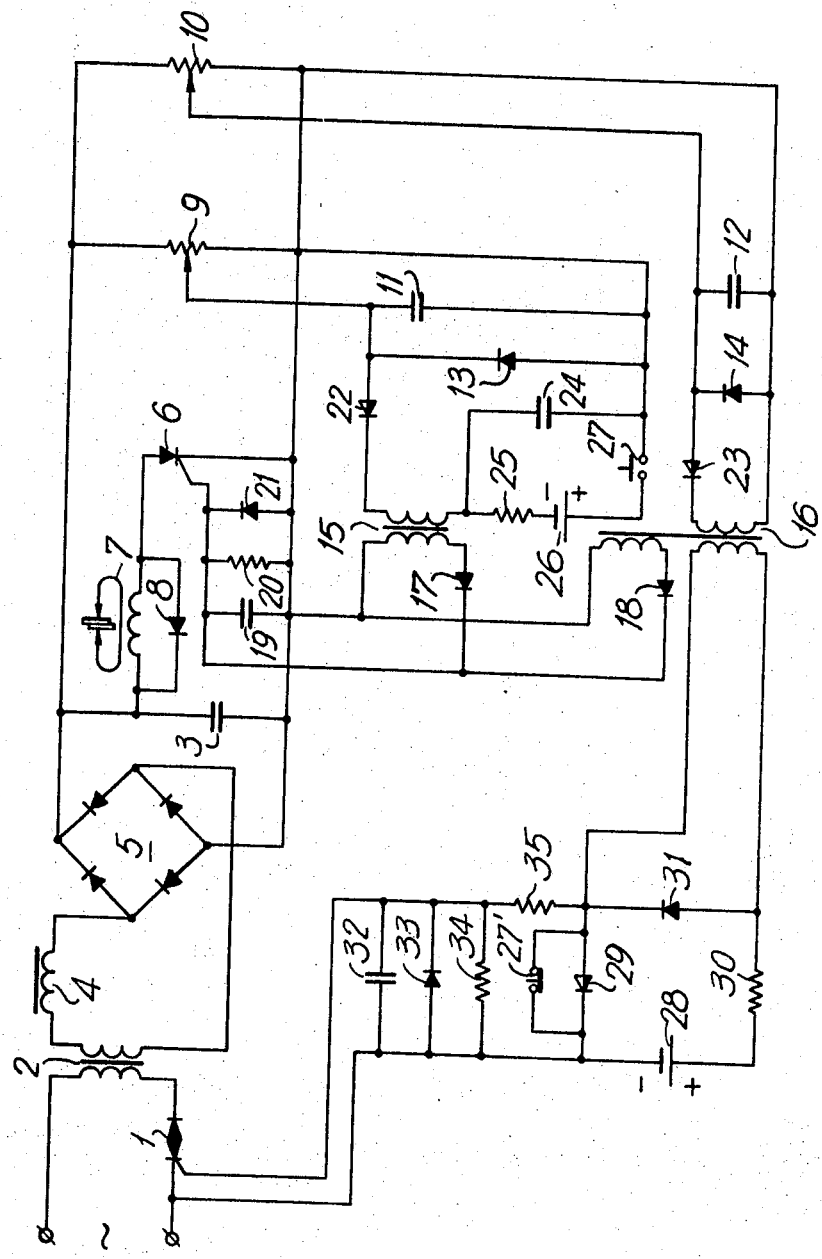
FIG. 1 shows a schematic circuit diagram of the condenser spot-welding machine according to the invention.

As is seen from FIG. 1, the condenser welding machine comprises a charge gate 1 (a symmetrical thyristor) switched into the circuit of the primary winding of a charging transformer 2, and connecting the operating capacitor bank 3 for charging. Connected to the secondary winding of the charging transformer 2 through a reactive current-limiting element 4 is rectifier 5 assembled according to a single-phase bridge circuit, and joined to the output of the rectifier is the operating capacitor bank 3. In the discharge circuit of the machine connected in series with the operating capacitor bank 3 are a discharge gate 6 (a thyristor), and a welding transformer 7 at the primary winding of which there is a shunting diode 8. Employed as voltage level setters are voltage dividers 9 and 10. The control unit consists of two circuits to shape the control pulses. At the inputs of these circuits there are placed shaping capacitors 11, 12 parallel connected to the lower arms of voltage dividers 9, 10, and shunted by diodes 13, 14.

Employment of the shaping capacitors 11, 12 permits raising the reliability of the machine operation, and using high-ohmic voltage dividers 9, 10. The outputs of the control unit circuits are coupled through pulse transformers 15 and 16, and dividing diodes 17, 18, to the input of the circuit of the discharge gate 6, capacitor 19, resistor 20, and diode 21 being coupled to the same gate to raise the operational reliability thereof. Said circuits comprise dynistors 22, 23 connected in series with the primary windings of the pulse transformers 15, 16, the circuit coupled to the output of divider 9 (to the lower arm thereof) comprising a dividing capacitor 24, parallel connected to which are resistor 25, a stabilized bias source 26 ensuring the "on" condition of dynistor 22, and normally open contacts 27 of the starting pushbutton. Besides, the control unit has a circuit to control the charge gate 1, comprising, in series, a bias source 28, dynistor 29 shunted by normally closed contacts 27' of the starting pushbutton, a limiting resistor 30, and a reference diode 31, coupled to which is the third winding of the pulse transformer 16. The control circuit also comprises capacitor 32, diode 33, resistor 34 which are connected in parallel with dynistor 29 through a limiting resistor 35 to one of the operating electrodes and to the control electrode of the charge gate 1.

In the initial condition the control circuit blocks the charge gate 1. Divider 9 permits the operating capacitor bank 3 to be charged to a lower level than divider 10, the switch-in voltage of dynistor 22 being composed of two voltages: the voltage conditioned by divider 9, and the voltage of the bias source 26. The starting pushbutton comprises normally closed contacts 27' in the control circuit of gate 1, and normally open contacts 27 in the pulse shaping circuit coupled to divider 9.

When the starting pushbutton is pressed, positive bias is fed to the control electrode of gate 1, and the circuit to switch in dynistor 22 is prepared for action.

On closure of gate 1 there starts smooth charging of the operating capacitor bank 3 through the reactive current-limiting element 4, and rectifier 5. On reaching the voltage level defined by divider 9, dynistor 22 is switched in. The pulse transformer 15 transforms the switch-in pulse to the discharge gate 6, and the operating capacitor bank 3 discharges onto the welding transformer 7. This first pulse only forms the contact surfaces of the parts compressed between the welding electrodes.

Dynistor 22 remains switched in, shunting the output of divider 9 as the current of bias source 26 flows through dynistor 22. During the discharge of the operating capacitor bank 3 gate 1 is not switched off, thus right after the first discharge the capacitor bank 3 starts charging up to the voltage set by divider 10, while gate 6 is blocked due to the shunting diode 8.

On reaching the voltage level defined by divider 10, dynistor 23 is switched in, and the control signal of the pulse transformer 16 cuts in the discharge gate 6. The capacitor bank 3 is once more discharged onto the welding transformer 7, thus passing the second pulse which makes the weld. At the same time the signal coming from the third winding of transformer 16 cuts in dynistor 29 which shunts the control circuit of the charge gate 1. The charge gate 1 is cut off disconnecting the charging circuit of the operating capacitor bank 3.

Once the starting pushbutton is released, the circuit returns to its initial condition.

When the start button is again pressed the two-pulse welding cycle is repeated.

Figure 2:
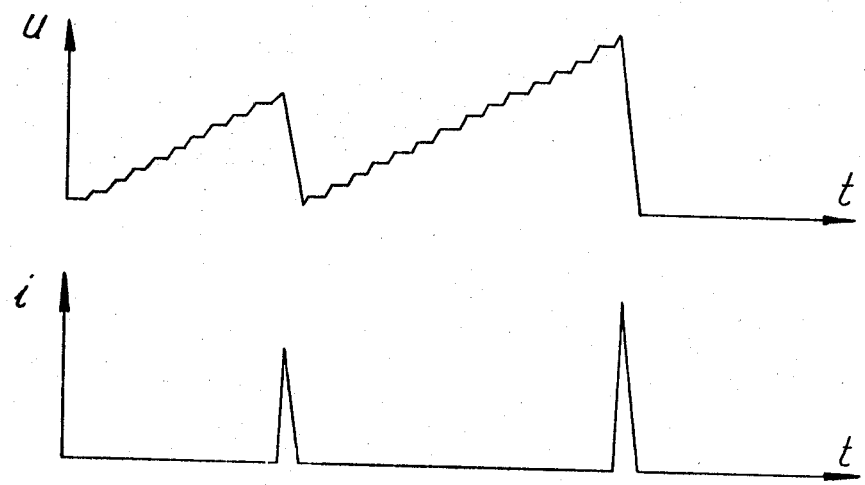
FIG. 2 shows diagrams of voltage across the capacitor bank, and current in the welding circuit, according to the invention.

The two-pulse welding process provided for by the proposed device is illustrated in FIG. 2 with diagram of voltage ($u$) across the operating capacitor bank, and of welding current ($i$).

As is seen from the diagrams, the two-pulse welding cycle is performed by two current pulses following each other, the first pulse with a smaller amplitude, as compared to the second one, forming the contact surfaces of the jobs compressed between the electrodes, and thus improving welding conditions, while the second pulse performs actual welding.

The two-pulse welding cycle is realized due to the fact that the capacitor bank 3 is twice charged to different voltage levels chosen by the voltage dividers 9 and 10, and is twice discharge to the welding transformer 7 through the discharge gate 6.

The proposed machine is advisable to be combined with a resistance spot welding apparatus, mainly for small parts (U.S.S.R. Pat. applications Nos. 1.048.304/25–27 and 1.777.014/25–27), for which patent is being applied.

What we claim is:

1. A condenser spot-welding machine, comprising; a rectifier unit for charging a capacitor bank; a welding transformer; two gates, one of said gates being connected to said capacitor bank for charging and the other said gate effecting the discharge of said capacitor bank through said welding transformer; a control unit for maintaining at least a two-pulse welding cycle in which the amplitude of each current pulse exceeds that of the preceding pulse, said control unit including a voltage level setter comprising at least two resistor voltage dividers connected in parallel to said capacitor bank, said voltage dividers having lower arms connected in parallel with capacitors, and diodes for shunting said capacitors in a reverse direction.

2. A machine as claimed in claim 1, including circuits connected in parallel to said diode-shunted capacitors, said circuits comprising; dynistors and a pulse transformer, said dynistors being connected in series to the primary windings of said pulse transformer, decoupling diodes connected to the secondary windings of said pulse transformer and in parallel with each other, a thyristor having a control electrode connected to said decoupling diodes, said thyristor adapted to serve as a discharge gate for effecting the discharge of said capacitor bank, said pulse transformer having third windings connected to said voltage dividers for effecting maximum charge of said capacitor bank, and a further thyristor having a control circuit adapted to serve as a charge gate, said third winding being connected to said control circuit and connected in series to the primary winding of said transformer.

3. A machine as claimed in claim 2, wherein said control circuit of the charge gate comprises the series connection to a voltage source, a current limiting resistor, a reference diode connected in parallel to the third winding of said pulse transformer and shunted by the normally open contacts of a starter pushbutton, a further dynistor having an anode and a cathode, said anode being connected through a resistor and said cathode being connected directly respectively, to the control electrode and the cathode of said charge gate.

* * * * *